United States Patent [19]
Kessenich et al.

[11] Patent Number: 6,055,538
[45] Date of Patent: Apr. 25, 2000

[54] METHODS AND SYSTEM FOR USING WEB BROWSER TO SEARCH LARGE COLLECTIONS OF DOCUMENTS

[75] Inventors: John M. Kessenich; Gregory W. Thelen; John R. Applin, all of Ft. Collins, Colo.

[73] Assignee: Hewlett Packard Company, Palo Alto, Calif.

[21] Appl. No.: 08/995,676

[22] Filed: Dec. 22, 1997

[51] Int. Cl.[7] .................................................. G06F 17/00
[52] U.S. Cl. ............................ 707/101; 707/100; 707/1; 707/2; 707/3; 707/4
[58] Field of Search ................................ 707/1, 2, 6, 101, 707/102, 4, 100; 370/60, 392; 711/216

[56] References Cited

U.S. PATENT DOCUMENTS

| | | | |
|---|---|---|---|
| 5,414,704 | 5/1995 | Spinney | 370/60 |
| 5,742,811 | 4/1998 | Agrawal et al. | 707/6 |
| 5,757,795 | 5/1998 | Schnell | 370/392 |
| 5,873,074 | 2/1999 | Kashyap et al. | 707/2 |
| 5,893,086 | 4/1999 | Schmuck et al. | 707/1 |
| 5,897,637 | 4/1999 | Guha | 707/101 |
| 5,960,434 | 9/1999 | Schimmel | 707/100 |

*Primary Examiner*—Wayne Amsbury
*Assistant Examiner*—Thuy Pardo

[57] ABSTRACT

A system for rapidly and easily searching large collections of documents using standard web browser programs as the user interface. The present invention parses a collection of text documents to identify symbols therein and builds a database file which identifies the file and line locations of each symbol identified. The database file is constructed to permit rapid searching for symbols to permit interactive use of the present invention as a search tool. A database client process interacts with the web browser via standard CGI techniques to convert browser commands and queries into appropriate server process requests. A server process receives such requests and manipulates the database files in response to the requests. Query results returned to the client process are then reformatted by the client process to return a document with hypertext links in place of search keys located in the database (e.g., an HTML page). The system of the present invention thereby provides for rapid searching of large collections of text documents which is not coupled to a specific toolset used to create any one of the documents and which uses a simple and well-known user interface, namely: web browsers.

2 Claims, 9 Drawing Sheets

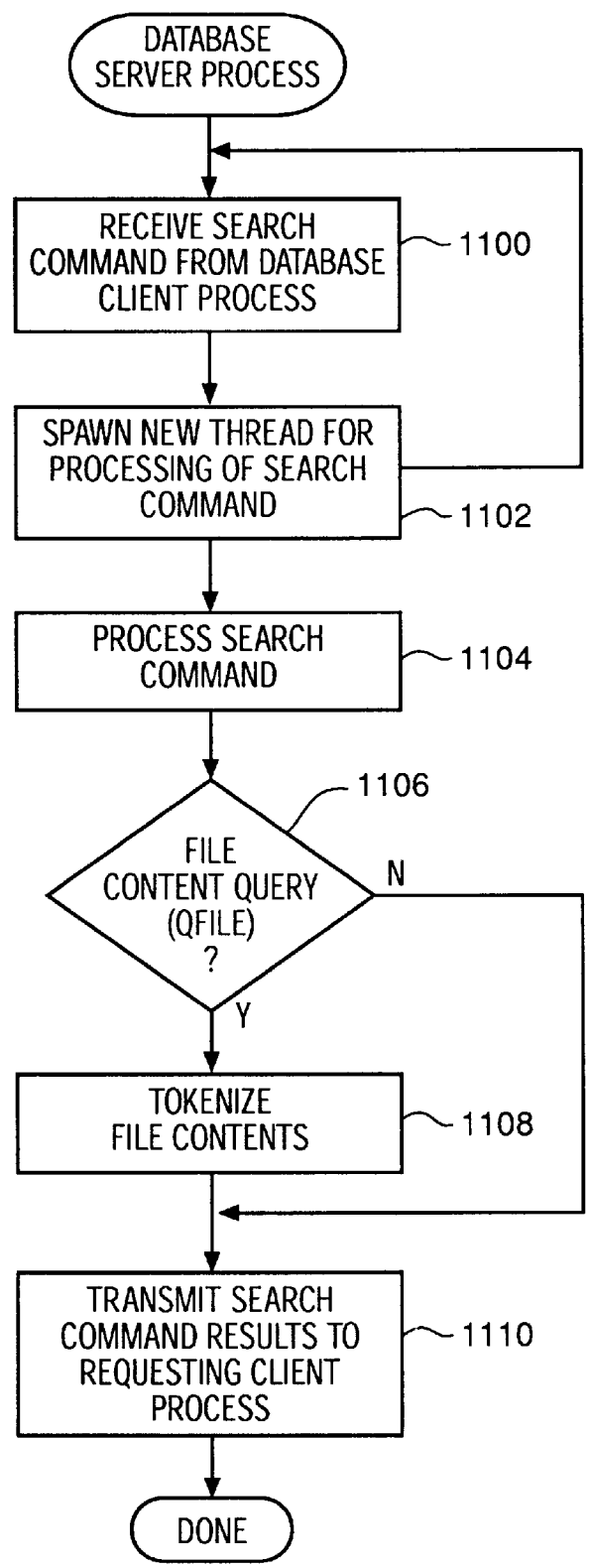

METHODS AND SYSTEM FOR USING WEB BROWSER TO SEARCH LARGE COLLECTIONS OF DOCUMENTS

BACKGROUND OF THE INVENTION

1. Field of the Invention

The present invention relates to systems for browsing documents and in particular to methods and systems for using a web browser to quickly search large collections of documents such as arbitrary text documents.

2. Discussion of Related Art

It is common to use a computer to assist a user in browsing through large collections of documents. For example, patent attorneys and patent examiners frequently review large patent documents or collections of related patent or legal documents. Or, for example, computer programmers frequently browse large files of computer source language programs or collections of related source language programs. Computers are applied to assist in such situations to improve, in particular, the speed of searching for symbols or keywords in the collection of documents. Manually searching large collections of documents can be extremely cumbersome and unproductive.

Text editors or word processors on computer systems are known to allow such browsing by simple sequential paging or scrolling through the documents or by search capabilities to locate particular words or phrases. However, such known techniques typically do not use indexed searching techniques to locate desired search terms in the document(s). Indexed searches are those which use an index to rapidly locate occurrences of a particular symbol or keyword in the text. Rather, simple linear search techniques are most commonly utilized by known text editor or word processing techniques. Such simple linear search techniques are impractical when scaled up to very large collections of documents. Simple, non-indexed search techniques cannot provide adequate performance when used in very large collections of documents.

For example, a team of programmers may need to rapidly search for related terms or phrases in the collection of source code files which implement an operating system. One such operating system, by way of example, comprises over 14,000 directories including 70,000 files totaling over 40,000,000 lines of source code. Simple, non-indexed search techniques are inadequate for such large collections of files.

To aid in browsing applications for computer programmers, source code browser programs are often included in program development environments (e.g., in computer aided software engineering (CASE) toolsets). Source code browser programs are usually tightly coupled to the underlying program development package and therefore are only operable in conjunction with the corresponding tools. However, source code browsers do not in general provide browsing service for arbitrary text documents outside the context of the program development tools. Furthermore, they are often constrained by the underlying databases which control the operation of the program development toolset. The databases which contain design information regarding a software development "project" often cannot handle such large collections of files as noted above. Lastly, different source code browser programs each provide a unique user interface potentially forcing a user to learn a proprietary user interface in order to scan collections of documents.

In a related aspect of browsing through documents, the Internet World-Wide Web (WWW) utilizes a web browser program at the user's computer (a web client program) to access information provided at a web server site. The protocols and standards which define WWW include hypertext links embedded within a document (also referred to herein as links or hyperlinks) as defined by the Hypertext Markup Language (HTML) standards and as communicated via the Hypertext Transfer Protocol (HTTP). A link is an object on a page of information which links to other related information. In standard WWW web browser programs, the user can move to this related information by simply "clicking" the link as it is displayed on the user's computer screen.

Links (or hyperlinks) are also known outside the context of HTML web browsing programs. For example, "help" files as commonly provided in operating systems and applications such as Microsoft Windows or Microsoft Office tools are often designed with hyperlinks to permit the user to thereby navigate among related help messages and topics. Further, web browsers are known to understand protocols other than HTML and to use hyperlinks therewith. For example, most web browsers also support the file transfer protocol (FTP) wherein file system directories may be viewed as a tree structure and the files and subdirectories therein displayed by the web browser as hyperlinks.

Web browser programs, per se, provide no indexed searching capability for the information presently displayed on the user's computer display or related information referenced by links in the present display. Rather, as for text and word processors noted above, the web browser programs, per se, offer mere sequential search of information presently displayed on the user's computer screen.

Associated with the WWW are a number of web server sites functioning as "search engines" which provide access to indexed information to locate web pages that are of interest to a user. In general, these search engines search large, proprietary databases for matches against a set of user supplied keywords. A list of web pages which match the user's supplied keyword search is then returned to the user's web browser. The list of matching web pages is presented by the web browser program on the user's computer display as a list of links to the matching web pages. The user may then select one of interest and click the link to visit that web page.

Standard features of such web browser programs allow simple "navigation" on the web. For example, standard features include the ability to move forward or backward over a chain a linked web pages. A first web page visited may provide a link to another page of interest and so on. Multiple such links may be thought of as a chain. Once having navigated to one page in such a chain of linked pages, the web browser provides standard features to navigate forward or backward on the chain of links already visited.

Present web search engines provide an initial list of web pages that may be of interest to the user in accordance with the keyword search terms provided. Once the user is viewing a particular web page so located, the information on the page is merely displayed as originally designed by the information provider of that web page. In other words, there is no capability provided by the web search engine to provide further searching within the particular web page being viewed. As noted above, the web browser program (the web client program) may provide simple linear search capability for text viewed on the web page. However, also as noted above, such simple linear searching of a large collection of documents can be quite inefficient. No efficient, indexed search capability is provided by present search engines or present browser programs to rapidly locate arbitrary text in a large document or collection of documents.

It can be seen from the above discussion that a need exists for a text search capability that is efficient at searches of large collections of documents and is easy to use providing a simple, standardized user interface.

SUMMARY OF THE INVENTION

The present invention solves the above and other problems, thereby advancing the state of the useful arts, by providing a system and associated methods for using web browser programs to efficiently search large collections of documents. More specifically, the present invention enhances a web browser so as to enable a user to quickly find pertinent information in a set of documents so large it cannot be printed, read, or even linearly searched interactively by a user with or without a computer. Still more specifically, the present invention dynamically builds a database of search keys or symbols found in a collection of text documents. Other aspects of the present invention, integrated within the web browser program, search the database to locate a desired symbol, keyword, or file in the collection of text documents and display the search results on the web browser display. The search results are converted to a page having hyperlinks (e.g., HTML hyperlinks) for each search key (symbol or filename) found in the collection of text documents. The converted page is then displayed on the computer screen by the web browser.

The building of the database is performed by a database builder process of the present invention. The builder process parses the collection of text documents to identify symbols (also referred to herein as tokens or keywords) within the collection of text documents. The parser may be generalized so as to enable useful parsing of a wide variety of textual document formats. Preferably, a plurality of parsing components are associated with the builder process. Each parser component of the builder process is optimized for parsing of a particular type of document. The database file of search keys is built from the parsed documents. The documents may be parsed to a tokenized level that encompasses literally every word of a text document (or less than every word if desired by the user).

The present invention permits a large collection of documents, including very large documents, to be viewed as a single related project of information. The hypertext version of any document (or search results) as displayed by the web browser allows quick access to related text without the need for the user to construct new search terms and use a costly linear search for each new concept to be searched. Furthermore, the present invention utilizes a well known user interface regardless of the type of document(s) being searched. The familiar user interface of web browser programs is utilized by the present invention to search large collections of documents. In addition, the present invention permits the same rapid, easy to use searching of documents regardless of the original source language and nature of the document. In other words, any text documents may be searched as a single project. The documents may be a heterogeneous mix of simple text documents, program source code text in any of several well known programming languages, etc. So long as the document may be parsed as a text file (or converted to a text file for parsing), the present invention allows the user to search the documents as a single related set of documents. Code browsers, as presently known, generally permit only searching of related documents (i.e., all documents that are in a common programming language and are part of a "project" as defined within the software development toolset). Other descriptive text documents cannot be easily integrated with the source code documents to permit broader searching by a code browser of concepts in related text.

The database file uses a hash table data structure that permits extremely rapid searching to locate symbols. The record corresponding to the symbol so located then provides a list of file entries each corresponding to one of a subset of files from the source files provided in which the corresponding symbol is found. Linked to each file entry is a list of line entries each representing a line number where the located symbol is found in the corresponding file. This hash structure permits rapid searching of the collection of documents for a specified symbol. A preferred physical embodiment of this hash table structure optimizes the structure both to reduce memory space requirements and to re-order the stored information in the database file to improve access performance thereto.

The database builder can be provided a list of tokens to be ignored in the search keys. For example, common connector words or keywords can be ignored since they appear so often. English connectors such as: "the", "and", etc. or programming language keywords such as "int", "char", etc. may be eliminated from the database by instructing the database builder to ignore them.

The present invention preferably accesses the database using a client/server model wherein a single server process coordinates shared access to one or more databases by multiple client processes. Such a database server process runs continuously on a computing node to provide shared access to databases built by the database builder module. A database client process provides a link between standard web browser programs and the database server process. As known to those skilled in the art, the database client process is actually coupled to a web server process which directly invokes the client process. The processing performed by the web server process in this situation is standard and so trivial as to be essentially ignored herein.

Using well known web browser integration techniques such as common gateway interface (CGI), the database client receives browser queries for a collection of documents. The client process then converts the browser commands and queries into appropriate server commands for processing by the server process. The server commands are then transmitted to the server process and query results (or command status) received in return. The results returned from the server process are "tokenized" in that each symbol or keyword that appears in the results is delimited as a token. The client process recognizes the tokens and converts them to a format appropriate to the browser program. Preferably, the results are reformatted into formats compatible with web browsers having hyperlinks corresponding to each potential symbol or keyword found in the search results. This converted format is then displayed by the standard web browser with hyperlinks for each search key to permit simple linking to related lines and files in the text documents.

The present invention is preferably implemented using well known network programming techniques for the client/server model interprocess communications. In particular, multiple web browsers can connect to a single database client process, multiple database client processes may connect to a single database server process, and a single database server process can service requests for multiple databases. Furthermore, the several components: web browsers, database client(s), and database server(s) may distributed over any number of interconnected computers or on a single computer.

Additional advantages of the invention will be set forth in part in the description which follows, and in part will be obvious from the description, or may be learned by practice of the invention. The advantages of the invention may be realized and attained by means of instrumentalities and combinations particularly pointed out in the appended claims and depicted in the figures as follows.

BRIEF DESCRIPTION OF THE DRAWINGS

FIG. 11 is a flowchart describing the operation of a database server process in accordance with the present invention of FIG. 1.

DETAILED DESCRIPTION OF THE PREFERRED EMBODIMENTS

Figure 1:
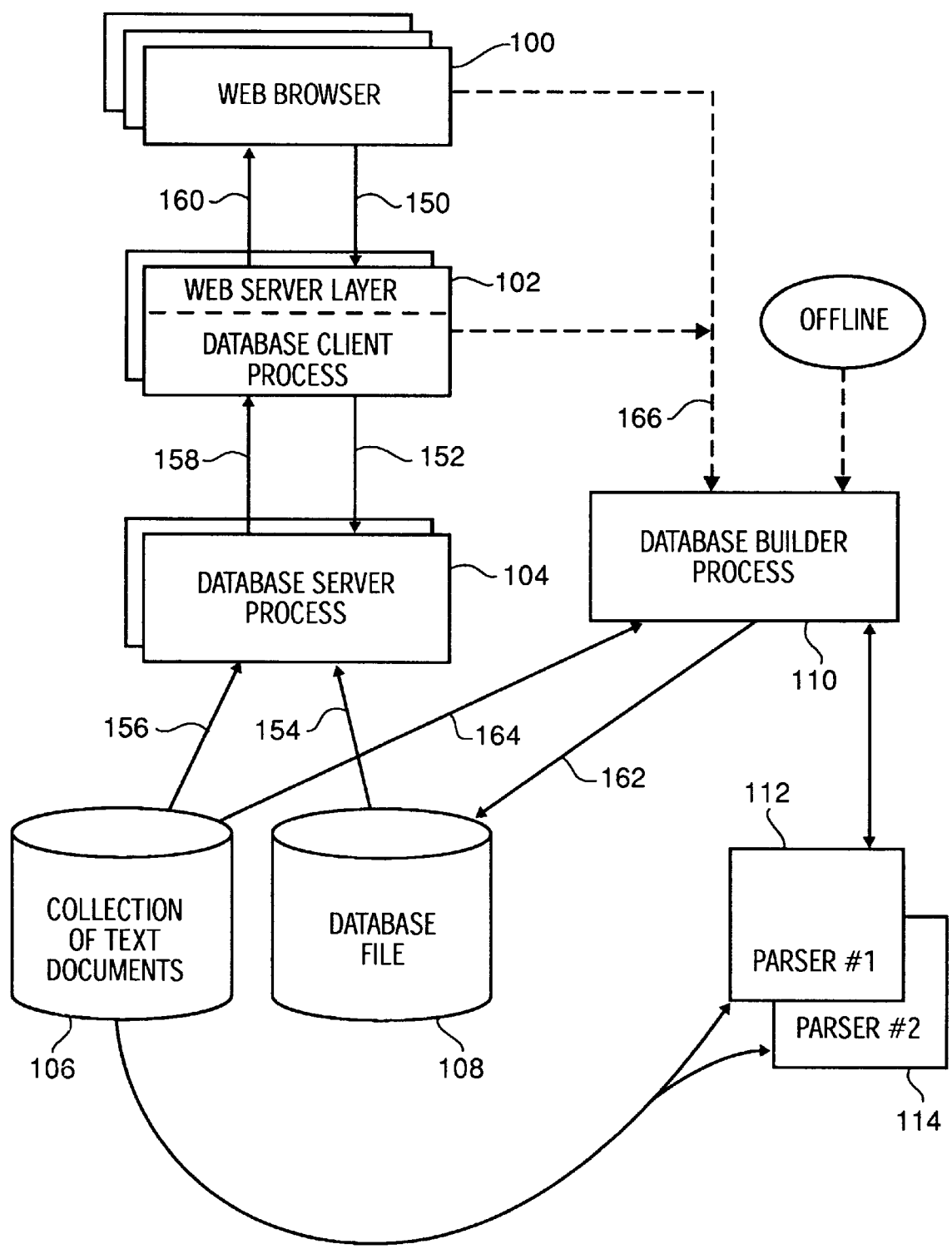
FIG. 1 is a block diagram of the elements of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Architectural Overview

FIG. 1 is a block diagram of the present invention in which a web browser 100 searches for symbols in a collection of text documents 106 by using the database file 108. As shown in FIG. 1, web browser 100 locates information using database file 108 by a requesting a information from database client 102 via path 150. Results of such requests are returned from database client process 102 to web browser 100 via path 160.

Database client process 102, in response to receipt of a request from web browser 100, passes database request information to database server process 104 via path 152 for actual processing utilizing database file 108. In like manner, database server process 104 returns results of the requests to database client process 102 via path 158. Database server process 104 performs the requested operations on database file 108 retrieving requested information via path 154. In addition, database server process 104 retrieves actual text from the collection of text documents 106 via path 156.

Those skilled in the art will readily recognize that FIG. 1 is intended merely as a schematic diagram of one exemplary embodiment of the present invention. In particular, web browser 100, database client process 102, and database server process 104 may all be processes resident and operable within a single computing system, or may be distributed over a plurality of computing systems and communicate using well-known inter-process, network communication techniques. Furthermore, database file 108 and collection of text documents 106 may reside physically on storage devices locally accessed by database server process 104, or may themselves reside on remote computing nodes accessible via paths 154 and 156 respectively.

Database client 102 is shown in FIG. 1 as including a "thin" web server layer. Those skilled in the art will recognize that the web browser 100 is a client program that is served by a web server process. As described herein, the web server process is a "thin" layer in the sense that it performs little processing of interest with respect to the present invention. To be precise, the web server process provides the actual interface to the database client process on behalf of the web browser process. Further, as is known in the art, a single web server process may be in communication with multiple web browser processes. The web server process may therefore invoke multiple database client processes on behalf of multiple web browser requests. The web server is said to be multi-threaded in this sense. For all practical purposes in describing the present invention, the web server layer may be ignored in favor of a description which focuses on the logical connection of the web browser 100 to the database client process 102.

In addition, those skilled in the art will recognize that the client/server model depicted in FIG. 1 as database client process 102 and database server process 104 is but one exemplary preferred embodiment of the present invention. More generally, web browser 100 searches for symbols within the collection of text documents 106 by utilizing indexing information stored in database file 108. The client/server model depicted in FIG. 1 localizes and modularizes various functions required to permit such database access by multiple users and web browsers. In particular, as noted above, a plurality of a web browsers 100 may communicate with a single shared web server process (a layer essentially ignored for purposes of describing the present invention). A single web server may invoke a plurality of database client processes on behalf of multiple web browsers due to the multi-threaded nature of the web server process. Further, a plurality of database client processes 102 may communicate with a single shared database server process 104. Multiple database server processes 104 may share simultaneous access to database file 108 and collection of text documents 106. Coordination of such shared communication paths is well-known in the art using standard client/server inter-process communication techniques.

In operation, a user, utilizing the well-known graphical user interface of web browser 100, fills in blanks on a display screen to compose a query for locating desired symbols, keywords, or files in the collection of text documents 106. The user's query is preferably a simple list of one or more symbols or keywords together with related control parameters to be located in the collection of text documents 106. The query so constructed is communicated to the database client process 102 utilizing well-known common gateway interface (CGI) techniques. The CGI specification is a well-known standard maintained by a the National Center for Super Computing Applications (NCSA) in Urbana-Champaign IL at the University of Illinois.

Query information is communicated from web browser 100 to database client process 102 via path 150 utilizing these CGI techniques. In like manner, database client process when 102 returns results of the query information to web browser 100 via path 160 using the CGI standards. Database client process 102 re-formats the query information into an internal request format defined by database server process 104. The transformed query information is then communicated from database client process 102 to database server process 104 via path 152 using a well-known client/server inter-process communication techniques. A more detailed description of a preferred embodiment of such an internal format is provided herein below.

Database server process 104 performs the requested query, accessing database file 108 and collection of text documents 106 via paths 154 and 156, respectively, to retrieve the requested information. The retrieved information is transmitted back to database client process 102 using an internally defined format (described herein below) via path 158.

Database client process 102 then performs necessary re-formatting of the returned information and then forwards the information on to web browser 100 as returned data via path 160. Specifically, database client process 102 transforms the internally defined response format of database server process 104 into an HTML representation thereof (or other format having hyperlinks defined therein for each symbol or keyword). Symbols or other keywords requested by the original query are presented as hypertext links in the returned HTML query results. Details of the specific format are dependent upon the particular query being performed as discussed herein below.

Database File Builder Process Operation

Database builder process of 110 operates in conjunction with one or more parsers 112 and 114 to construct database file 108 by parsing the collection of documents 106. A shown in FIG. 1, database builder process may be initially invoked as an offline procedure, or as a request initiated by web browser 100 directly or indirectly via database client process 102. Those skilled in the art will recognize the equivalence of many techniques for invoking database builder process 110. For example, database builder process 110 may be automatically invoked by additional procedures (not shown) which recognize changes made in collection of documents 106.

A shown in FIG. 1, database builder process 1 10 is operable with one or more parsers 112 and 114. Each such parser 112 or 114 may be adapted for optimally parsing a particular type of source documents language. For example a first parser may be optimally adapted for parsing a particular computer source programming language while another parser may be particularly well-suited to parsing of legal documents. When invoked to create a database file 108 from collection of text documents when 106, database builder process 110 may be instructed as to the preferred parser to be used with each document in the collection of text documents 106. Alternatively, as will be apparent to those skilled in the art, database builder process 110 and/or parsers 112 and 114 may automatically detect the type of a particular source document and associate a preferred parser therewith.

Figure 8:
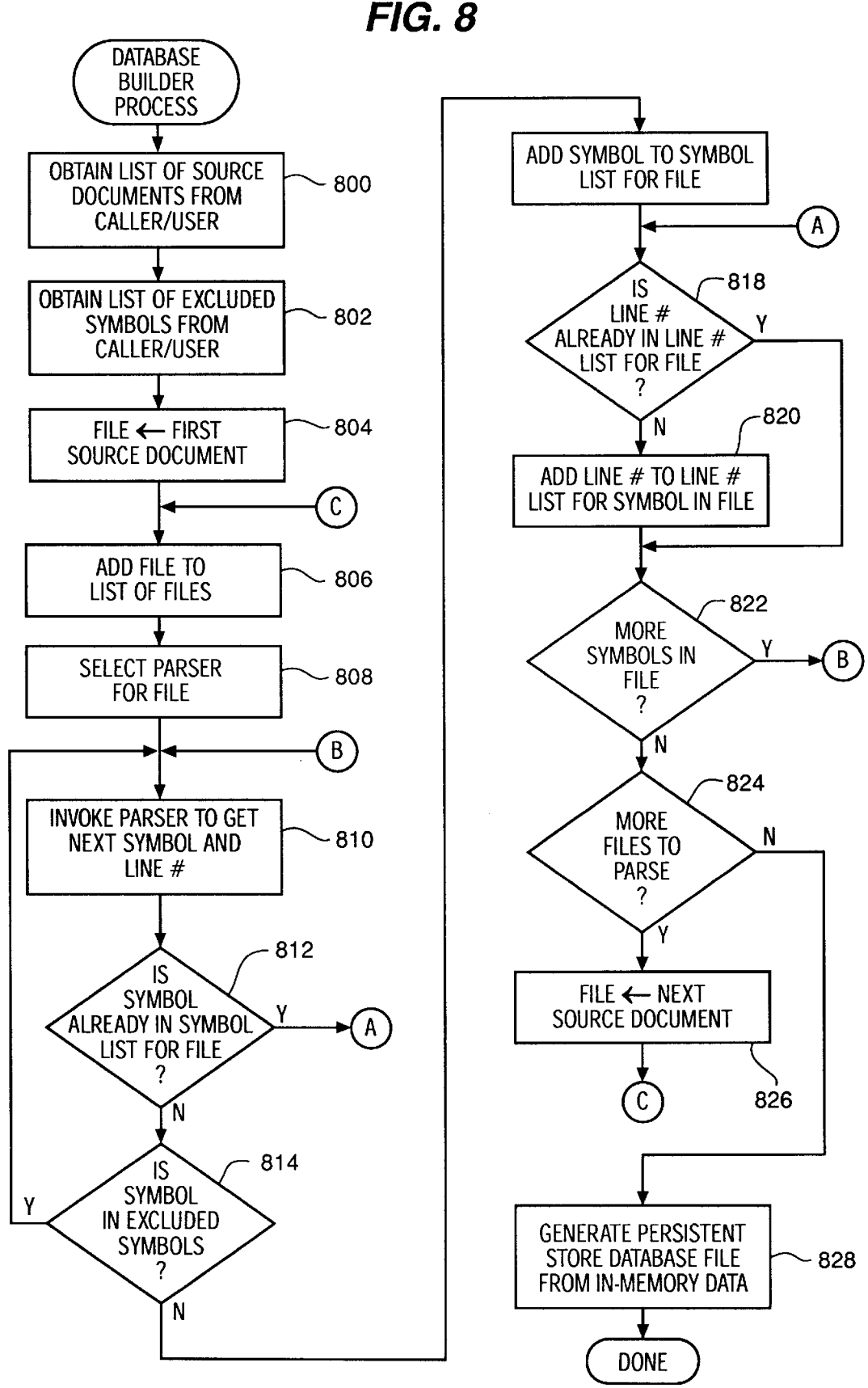
FIG. 8 is a flowchart describing operation of the database builder in accordance with the present invention of FIG. 1.

FIG. 8 is a flowchart describing the operation of database builder process 110. Element 800 is first operable to obtain a list of source documents from the caller or user of database builder process 110. As noted above, database builder process 110 may be invoked directly by an interactive user or may be invoked by operations of web browser 100 and/or database client process 102. Element 800 is therefore operable to obtain the list of source documents from the calling process or directly from an interactive user. The list of source documents provides a path name for each document whose symbols are to be indexed in the resultant database file. Element 802 is next operable to obtain the list of excluded symbols from the caller or user of database builder process 110. It is common in several types of source documents to encounter frequently used symbols or keywords that are unlikely to be of significant value when searching the collection of text documents. For example, in a typical English document, connector words such as "the", "or", "and", etc. would substantially increase the size of the database file to be created without adding significant value to the search user. Or, for example, C language source code documents may contain frequent instances of keywords such as "int", "for", "while", etc. Element 802 is therefore operable to obtain a list from the user or calling process of words or symbols to be excluded from the indexing performed by database builder process 110.

Element 804 is next operable to initialize processing by the database builder process for the first file in the collection of text documents provided by the calling process or user. Element in 806 next adds the file presently being processed to the list of files (list of path names) maintained by the database builder process. The database builder process may use well-known computer memory data structures for building the various data constructs of the database file. As will be seen below, a final step in the database builder process converts such internal memory based data structures into compressed data structures preferred for the physical embodiment of the database file (as discussed herein below).

Element 808 is next operable to select an appropriate parser for the file presently being processed. As noted above, the database builder process may be associated with one or more parsing processes. Each parsing process may be optimized for parsing a particular form or type of source document. Element 808 is therefore operable to determine the type of file presently being processed and to select a preferred parser in association therewith. Those skilled in the art will recognize that a parser process may be generalized so as to be capable of processing any of several source file types. It will therefore be recognized that database builder process may be associated with but a single parser process as well as with a plurality of parser processes customized or optimized for particular types of documents.

Element 810 is next operable to invoke the selected parser to retrieve the next symbol in the present source file. This invocation of the parser retrieves both the symbol and line number of the next symbol found in the source file. Element 812 is next operable to determine if the retrieved symbol is already present in the symbol list being constructed (as below) by the database builder process. If the retrieved symbol is already present in the symbol list associated with the present file, processing continues to element 818. Otherwise, element 814 is next operable to determine if the retrieved symbol is present in the list of excluded symbols provided by the user or calling process. If element 814 determines that the retrieved symbol is to be excluded, the symbol is ignored and processing continues by looping back to element 810. Otherwise, element 816 is next operable to add the retrieved symbol to the symbol list being constructed for the current file. Processing then continues with element 818.

Element 818 is next operable to determine whether the symbol just retrieved at a particular line number in the present file is already known to be present at that line number in the line number list being constructed (as below) for that symbol of the present file. If the symbol is already known to be present at the identified line of the current file, processing continues with element 822. If the symbol of is not known to be found at the identified line number in the present file, element 820 is next operable to add a line number entry to the line number list for the corresponding symbol in the present file. Element 822 is next operable to determine if the entire file has been processed or if all symbols in the present file had been processed as above. If further symbols remain to be processed, processing continues by looping back to element 810. Otherwise processing continues at element 824.

Element 824 is operable to determine whether additional files in the collection of text documents remain to be parsed and processed as described above. If no additional files remain to be processed, processing continues at element 828 to generate the persistent storage physical format of the database file as described below with respect to FIG. 3. The above identified operations of database builder process 110 preferably construct in-memory computer data structures as well known to those skilled and art. The in memory data structures are traversed by element 828 in a sequence to produce the optimal physical storage structure described herein below. If element 824 determines that no further files require processing, element 826 is next operable to begin processing the next source document in the collection of text documents. Processing then continues by looping back to element 806 to continue processing with a new source file.

Database File Structure

Figure 2:
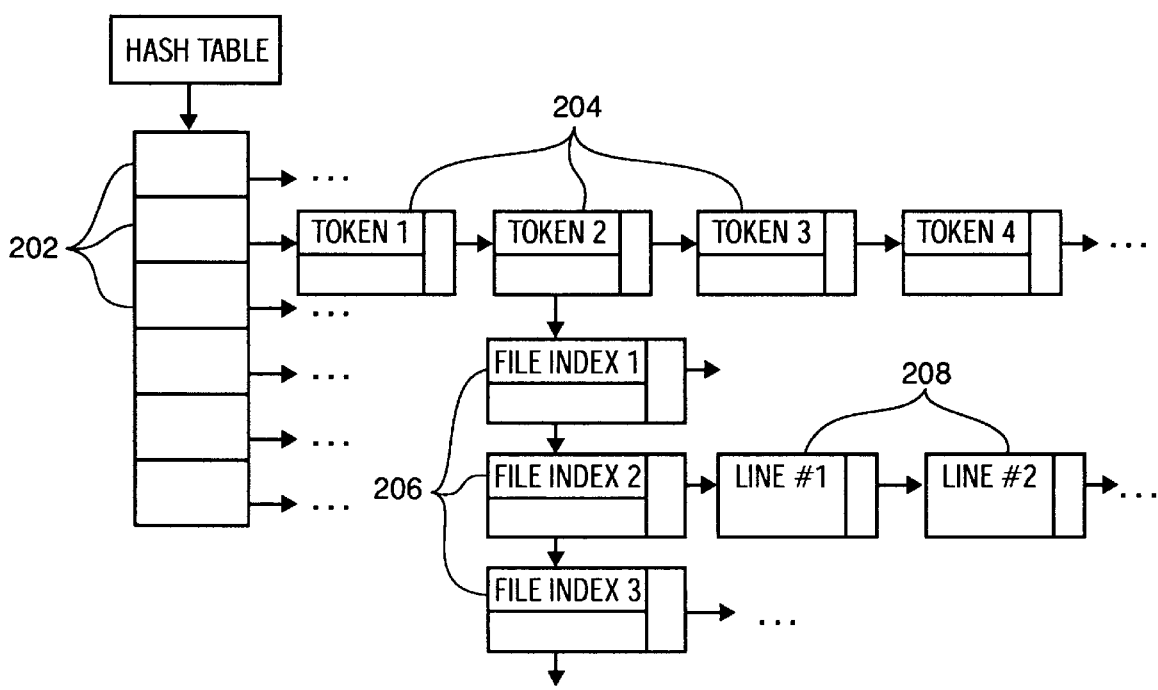
FIG. 2 is a block diagram providing a logical description of the structure database file of the present invention of FIG. 1.
Figure 3:
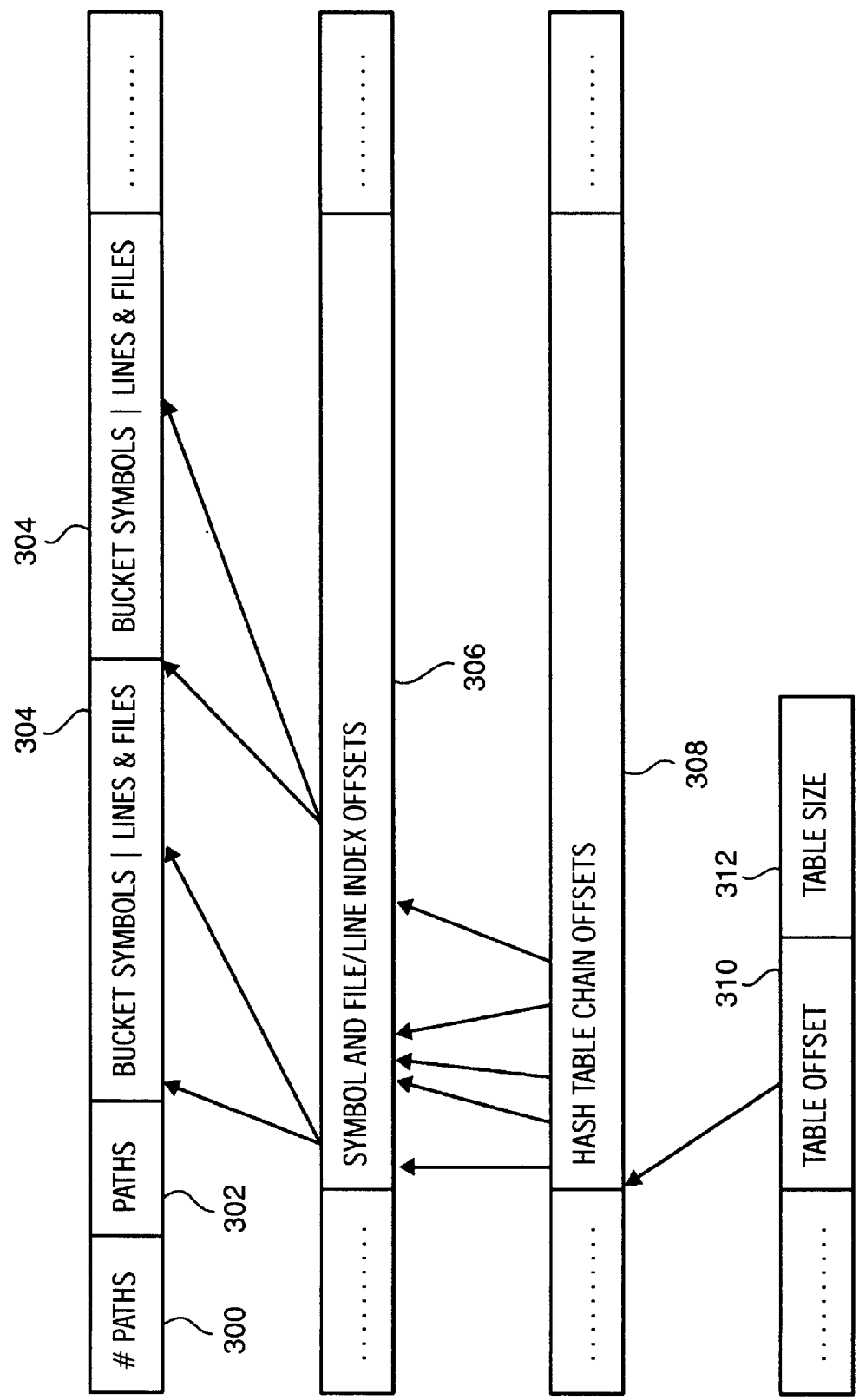
FIG. 3 is a block diagram providing the preferred physical embodiment of the structure of the database file of FIG. 1 and as logically depicted in FIG. 2.

FIGS. 2 and 3 depict the database file data structures in two forms. First, FIG. 2 describes the database file data structure in logical terms, as logically understood and manipulated by database server process 104 to perform requested queries. FIG. 3, by way of contrast, is the preferred physical embodiment of the database file logically depicted in FIG. 2. In particular, the preferred embodiment depicted in FIG. 3 stores the database file in such a manner as to reduce its total size and to improve performance in accessing the database file. More specifically, the preferred physical embodiment of database file 108 uses a compressed encoding of integers (as discussed herein below) to reduce storage requirements for the database file and to improve overall access performance to the database file. Furthermore, the preferred physical embodiment of the database file as depicted in FIG. 3 improves access performance thereto by storing the data in a sequence which more closely matches the locality of references typified by database server process 104. In other words portions of the database file which are likely to be accessed chronologically near one another are stored physically near one another to reduce access times required for reading the database file.

In particular, FIG. 2 describes a hash table data structure comprising at its highest layer an array of hash table bucket pointers 202. As is well-known in the art, the number of hash table bucket pointers 202 is typically less than the number of symbols or key values which are "hashed" into indices of the hash table. Each table bucket pointer 202 therefore is the head the pointer to a list of symbol entries 204 all of which hash to the same hash value. Each symbol entry 204 includes identification of the symbol (or keyword also referred to herein as token) as well as a pointer to a list of file entries 206. Each entry in the list of file entries 206 represents a file (text document) in the collection of text documents (also referred to herein as source documents) in which the corresponding symbol (token) is found. Each file entry 206 includes identification of the file path represented thereby as well as a pointer to a list of line number entries 208. Each line number entry 208 includes identification of a line number within the corresponding file at which the corresponding symbol is located.

The data structure of FIG. 2 is exemplary of one preferred logical embodiment of the database file 108 structure. Those skilled in the art will recognize many equivalent data structures to provide indexed search capabilities for the symbols found in the collection of text documents.

Access time to database file 108 is a critical factor in the overall interactive performance of the present invention. For this reason, the logical structure described in FIG. 2 may be inadequate to provide the requisite interactive performance. Specifically, the database file size may be quite large depending on the number of symbols found in the collection of text documents. In addition the logical structure depicted in FIG. 2 does not inherently provide locality of access in the data structure. That is to say a first access to the database and a second access to the database for related items may require randomly scattered access to differing portions of the database file.

FIG. 3 is a schematic representation of the preferred physical embodiment of database file 108 of the present invention. As noted above, the preferred physical embodiment of database file 108 shown in FIG. 3 utilizes compressed encoding of integer values (described herein below) to reduce the memory requirements for storage of database file 108. In addition, the organization of entries in the physical embodiment of database file 108 as depicted in FIG. 3 improves access to database file 108 by improving locality of references.

The preferred database file physical structure includes all requisite data in a preferred order as follows. First, the number of path names comprising the list of text documents is encoded as in integer value in #paths 300. Next, the actual string data of the path names of the collection of text documents is encoded in paths 302. The strings representing the file (path) names of the text documents used to construct the database are concatenated (preferably with an intervening separator character) in the order in which they were processed by the database builder process. Next, the symbols and associated file and line numbers are stored in a concatenated form for each element of the array of hash table bucket pointers (stored later in the physical format). Specifically, each bucket list entry 304 includes the symbols (as concatenated strings) in that bucket followed by the list of files and corresponding line numbers within those files where the symbols are located. Symbol and file/line index offsets 306 provide pointers into the bucket list entries 304 for each distinct symbol in the list of symbols for particular bucket list entry 304. Next, hash table chain offsets 308 provide offsets the into symbol and file/line index offsets 306 indicating the offset of the first symbol in the symbol list associated with the hash bucket pointer. Table offset 310 provides a pointer to the first hash table chain offsets 308. Lastly, table size of 312 provides the entire size of the hash table which in turn provides the starting position of symbol and file/line index offsets 306.

Integer Compression

All integral offsets and pointer values described above with respect to the preferred physical embodiment of database file 108 as shown in FIG. 3 are compressed to reduce the amount of storage required in the preferred physical embodiment of the database file. It is noted that pointer and offset values in such a logical data structure as depicted above with respect to figure to often include a significant number of leading zeros. The integer compression or used in conjunction with the present invention reduces the number of leading zeros required to be stored for such pointers and offsets.

In particular, integer values in the range of 0 through 127 are encoded in a single byte whose most significant bit is 1. Integer values in the range 128 through 16,383 are encoded in two bytes whose most significant two bits are 01. Integer values in the range 16,384 through 2,097,151 are encoded in three bytes whose most significant three bits are 001. Lastly, integer values in the range 2,097,152 through 536,870,911 are encoded in four bytes whose most significant three bits are 000. Those skilled int he art will recognize that the encoding technique described above may be easily extended to representations of larger number using more than four bytes.

Methods of the present invention decode the compressed integer values as information is accessed from the compressed database file. Those skilled in the art will readily recognize the decompression technique as mirror images of the above compression description. The compression and decompression techniques may be further understood with reference to the following C++language code listings.

```
void
WriteCompInt(unsigned int v)    // compression encoding function
{
    // We cannot deal with numbers so large that their upper bits
    // become tags for numbers presumed smaller.
    //
    if ((v & 0xe0000000) != 0) {
        printf("Numbers are too large to create a database.\n"
            "Try building a smaller database.\n");
        exit(1);
    }
    if ((v & ~0x7f)==0) {
        // Number can fit in one byte with the top bits flagged as 1
        putc(v | 0x80, OutFile);
        ++CurOffset/
    }
    else if ((v & ~0x3fff)==0) {
        // Number can fit in two bytes with the top bits flagged as 01
        putc((v>>8) | 0x40, OutFile);
        putc(v & 0xff, OutFile);
        CurOffset += 2;
    }
    else if ((v & ~0x1fffff)==0) {
        // Number can fit in three bytes with the top bits flagged as 001
        putc((v>>16) | 0x20, OutFile);
        putc((v>>8) & 0xff, OutFile);
        putc( v    & 0xff, OutFile);
        CurOffset += 3;
    }
    else {
        // Number can fit in four bytes with the top bits flagged as 000
        putc((v>>24) & 0x1f, OutFile);
        putc((v>>16) & 0xff, OutFile);
        putc((v>>8) & 0xff, OutFile);
        putc( v    & 0xff, OutFile);
        CurOffset += 4;
    }
    return;
}
int
TScanDB::ReadCompInt(    // compression decoding function
    unsigned char **FilePtr
    )
//
// Read and decompress an integer from the current file pointer location
// in the memory mapped data base.
//
{
    if (**FilePtr & 0x80) {
        // byte starts with 1, numbers up to 2^7-1 = 127
        *FilePtr += 1;
        return ((*FilePtr)[-1] & 0x7f);
    }
    if (**FilePtr & 0x40) {
        // byte starts with 01, numbers up to 2^14 - 1 = 16,383
        *FilePtr += 2;
        return ((((*FilePtr)[-2] & 0x3f) << 8) | (*FilePtr)[-1];
    }
    if (**FilePtr & 0x20) {
        // byte starts with 001, numbers up to 2^21 - 1 = 2,097,151
        *FilePtr += 3;
        return (((*FilePtr)[-3] & 0x1f) << 16) |
            ((*FilePtr)[-2] << 8) | (*FilePtr)[-1];
    }
    // byte starts with 000, numbers up to 2^29 - 1 = 536,870,912
    *FilePtr += 4;
    return ((*FilePtr)[-4] << 24) | ((*FilePtr)[-3] << 16) |
        ((*FilePtr)[-2] << 8) | ((*FilePtr)[-1]);
}
```

The above integer compression encoding technique provides compression ratios of the database file anywhere between 1X and approximately 4X.

Still further integer compression may be achieved with a second compression techniques applied in conjunction with the above. As discussed above with respect to FIG. 3, sequences of integer offset values are concatenated in the compressed, preferred physical embodiment of the database file of the present invention. As noted above, the integer encoding techniques above provide some compression to reduce leading zero bits in integer numbers. The second compression techniques includes reducing offset values which follow a first offset in a sequence of concatenated offset values to be relative offsets. The relative offsets provide a delta integer value from the immediate predecessor offset value. The first offset value in such a sequence of offset values is the full integer value. The next offset value is relative to the first, the third is relative to the second, fourth to the third etc. For example the sequence of values:

100,200, 500, 1000 are encoded as the sequence 100, 100, 300, 500

As an alternative, each subsequent integer offset value in a sequence may be relative to the first such value. For example, the same sequence:

100, 200, 500, 1000 may be encoded as:

100, 100, 400, 900

Clearly the former approach provides superior compression and is therefore preferred, The latter method may require less computation in that the sequence of compressed number need not be completely parsed. Only the leading bits need be parsed to determine the number of bytes (as described above). The remaining byte which encode the integer value need not be accessed to determine the value of a latter value in the sequence.

Web Browser Operation

Figure 9:
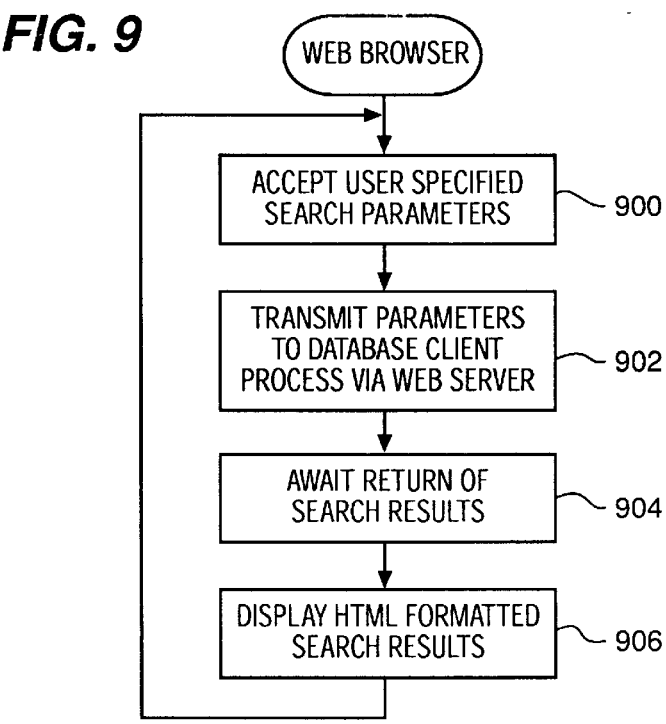
FIG. 9 is a flowchart describing operation of a web browser in accordance with the present invention of FIG. 1.

FIG. 9 is a flowchart describing the operation of a standard web browser as modified to work in conjunction with the methods processes and structures of the present invention. Those skilled in the art will recognize that FIG. 9 does not describe operation of web browsers in general as presently known in the art. Rather, FIG. 9 describes only the specific features a web browser as adapted to utilize the present invention. In particular, element 900 awaits and accepts user input to specify search parameters to be applied to collection of text documents. Not shown are the processing steps which serve to identify either the collection of documents by path names nor the steps to provide the pre-built database file path. Such processing is well-known to those skilled in the art.

Element 902 is next operable to transmit the search parameters accepted by processing of element 900 to the database client process for further processing. Element 904 than awaits return of the search results through processing initiating completed via the database client process. Lastly element 906 displays the HTML formatted search results (or other format having hyperlinks therein) as returned from the database client process. Processing continues by looping back to element 900 to await a further search parameters. Those skilled in the art will recognize that standard web browser processing techniques may invoke further processing by clicking a hyperlink in the search results displayed by operation of element 906 and as returned by operation of the database client process. Further, it will be recognized that linear search techniques within standard web browsers may be invoked to further refine the search of the information returned and displayed on the web browsers computer display screen.

Database Client Process Operation

Figure 10:
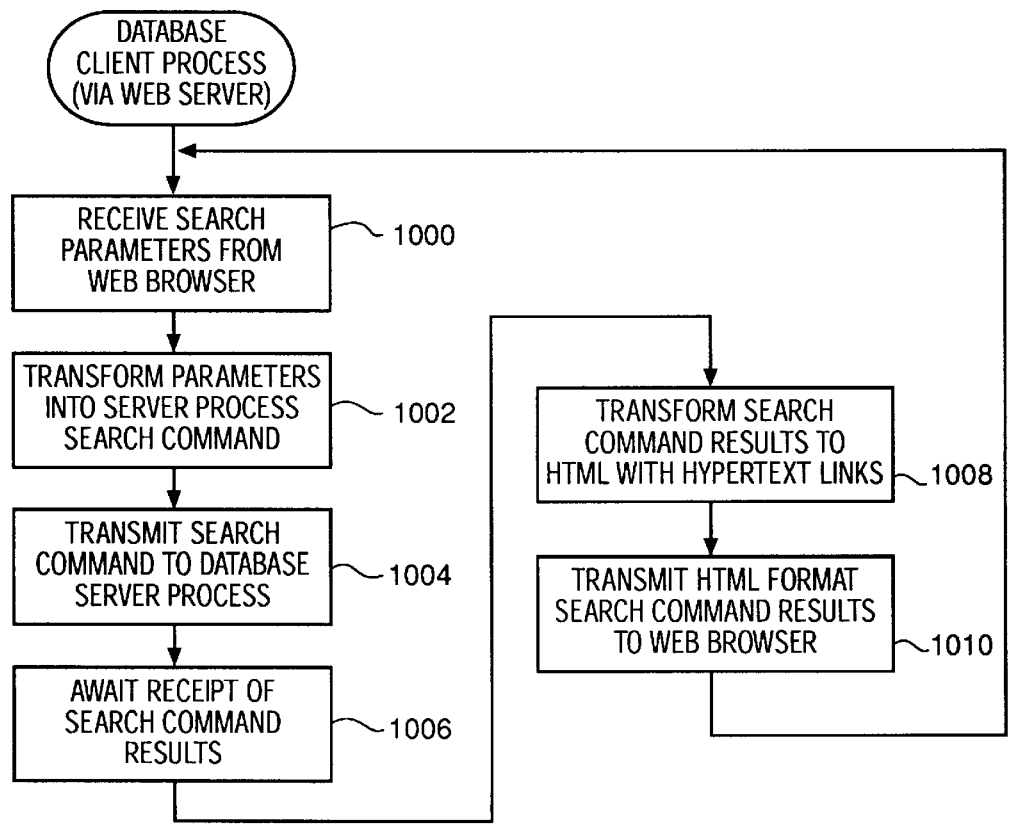
FIG. 10 is a flowchart describing the operation of a database client process in accordance with the present invention of FIG. 1.

FIG. 10 is a flowchart describing methods operable within the database client process of the present invention. As noted above, a web browser invokes the services of the present invention via the database client process using the CGI communication gateway standards. The database client process, in turn, communicates with the database server process to effectuate the query operations requested by the web browser. Those skilled in art will recognize that the features of the present invention may be implemented with or without such a client/server architecture. As noted above, a web browser (via communications with a web server process) may invoke a database manipulation program which directly accesses the database file rather than doing so through a database server process. The client/server model of the present invention provides benefits in coordinating multiple shared simultaneous access to the database file. In addition, the database client/server model preferred in the current invention permits the web browser, web server, and database server processes to be distributed over independent computing nodes. In other words, the client/server model preferred in the present invention is more easily integrated into a distributed computing environment wherein processes communicate in a standardized manner regardless of the physical computing node on which they are operating. Lastly, the database server process of the present invention, as discussed in additional detail below, supports a query command stream and returns its results essentially in ASCII text. This allows the database server process to be developed, tested, and debugged independent of the database client process.

Element 1000 is first operable to receive search parameters of a query request from the web browser. As noted above the web browser constructs a search request by accepting search parameters from an interactive user. Those search parameters are transmitted directly to the database client process utilizing the CGI interfacing techniques. Element 1002 is next operable to transform the search parameters received in the search request into appropriately formatted search commands supported by the database server process of the present invention. Details of the search commands so supported are provided herein below. Element 1004 is next operable to transmit the transformed (re-formatted) search command to the database server process of the present invention. As noted above, the database client process and database server process of the present invention preferably communicate using well-known inter-process communication techniques. Such communication techniques simplify coordination of shared access to the database file.

Element 1006 is next operable to await receipt of results of processing the transformed (re-formatted) search command previously transmitted to the database server process. As above, the search results are returned from the database server process to the database client process utilizing well-known network inter-process communication techniques.

Element 1008 is then operable to transform the search command results returned from the database server process into an appropriate page including hyperlinks indicative of the search results. The search results as returned from the database server process are formatted in an internal tokenized form as presented herein below. Tokenized symbols are transformed by element 1008 into hyperlinks for generating further query commands potentially of interest to the user. Some queries return results which have a pre-defined format as discussed below wherein tokenizing is not performed by the server process. Rather, elements (symbols or keywords) which may of interest for further search processing are clearly defined by the format of the query response.

Element 1010 is next operable to transmit the reformatted search command results back to the web browser which initiated the search request. As noted above the web browser and database client process communicate utilizing well-known CGI techniques. Processing than continues by looping back to element 1000 to await receipt of further search requests and associated search parameters from an associated web browser.

Database Server Process Operation

FIG. 11 is a flowchart describing the processing performed by database server process 104 of the present invention. Element 1100 is first operable to receive a search command from the database client process. As noted above search commands received from the database client process are formatted in an internal format supported and defined by the database server process as discussed herein below. Element 1102 is next operable to spawn a thread for processing of the received search command. Well-known multi-threaded programming techniques are applied to permit multiple search commands to be processed on behalf of multiple database client processes. The multi-threaded programming technique also permits the server process to more easily "cleanup" on behalf of a failed processing thread. For example, failure of a single thread, processing a particular search request, does not impact concurrent processing by other threads of other search requests on behalf of other database client processes. The multi-threaded aspect of the database server processing is depicted in FIG. 11 by the multiple arrows exiting from processing of element 1102. The newly spawned thread continues processing with element 1104–1110 through to completion. The main line database server process continues processing by looping back to element 1100 to await receipt of another search request from another database client process.

The newly spawned thread of the database server process continues with element 1104 to process the search request received from the database client process. Element 1106 is next operable to determine if the query was for the contents of a file (a file contents query as generated by the browser program). If not, processing continue with element 1110 to transmit the search results to the database client process for further processing on behalf of the web browser program. If the query is a file content query, processing continues with element 1108 to tokenize the file content query results.

As noted above, each symbol in a file content query is tokenized by the database server process. In particular, each symbol in the file content text stream is delimited by the TOKEN_START and TOKEN_END characters as discussed below. The tokenized results are then transmitted to the database client by operation of element 1110 for further processing on behalf of he web browser program.

Those skilled in the art will readily recognize that elements 1104–1110 (a single thread of the database server process) may operate concurrently to provide streaming of the resultant data back to the database client process requesting the search. In other words, as element 1104 continues to process the search command thereby generating search results, elements 1106–1110 may concurrently operate to transmit those results already generated back to database client process. In this manner, the web browser, the database client process, and database server process may all overlap their processing to provide the desired rapid response to the interactive user of the web browser. Early results of the query process are viewable at the user's computer display even as later results are yet to be generated. The search results are said to be streamed from the database server process through to the web browser for display on the user's computer screen.

Element 1104 is described above as performing the specified query through use of the database file. Such an operation is well understood by those skilled in the art in view of the logical description of the database file presented above with respect to FIG. 2. With respect to the preferred physical embodiment of the database file as discussed above in conjunction with FIG. 3, the following pseudo-code listing is helpful in understanding the detailed operation of element 1104.

```
// MAKE_PTR turns an internal file offset into a real C-language pointer
// for direct dereference by the C-runtime environment. If the offset was
// zero, MAKE_PTR returns NULL, otherwise it adds the offset to the base
// of the memory mapped database in memory.
// ReadCompInt( ) reads a compressed integer from the database and converts it
// to a normal integer. ReadCompInt( ) also advances FilePtr to the next byte
// after the compressed integer.
Lookup(Key, MatchCase, OutsideCurlies)
    HashIndex = HashKey(Key)
    FilePtr = MAKE_PTR(HashTable[HashIndex])
    if FilePtr is NULL, this hash chain is empty, so no matches, so exit
    // This outermost loop is executed once for each match, the inner
    // loop loops across non-matches within the chain between matches
    // Could still be zero matches if token doesn't exist.
    // Could be 1 match if token exists and we're matching case.
    // Could be many matches if matching case.
    loop, to find the next match
       loop, to skip over non-matches
          KeyOffset = ReadCompInt(&FilePtr)
          if KeyOffset is NULL, then no match, exit this loop
          KeyOffset = MAKE_PTR(KeyOffset)
          DataOffset = ReadCompInt(&FilePtr)
          if MatchCase and case sensitive match between *KeyOffset and Key, or
               case insensitive match between *KeyOffset and Key
             then match found, exit this loop
       end loop to skip over non-matches
       if no match found, then exit
       NextKeyOffset = FilePtr
       FilePtr = MAKE_PTR(DataOffset)
       loop, to traverse the list of files
          FileNum = ReadCompInt(&FilePtr)
          if FileNum is zero, done, exit this loop
          LinesOffset = ReadCompInt(&FilePtr)
          NextFileOffset = FilePtr
          FilePtr = MAKE_PTR(LinesOffset)
          loop, to traverse the list of lines with the token
             LineNum = ReadCompInt(&FilePtr)
             if LineNum is not zero, and OutsideCurlies is set, and the
                  LineNum is tagged as OutsideCurlies
                then MATCH FOUND: process match
          end loop when LineNum is zero
          FilePtr = NextFileOffset
       end loop to traverse list of files
       FilePtr = NextKeyOffset
    end loop to find next match
```

Web Browser/Database Client Protocol

The present invention provides for various search requests (also referred to herein as queries) between the web browser and the database client process. As noted above, the web browser and database client process preferably communicate using the CGI standards. A query is communicated from the web browser to the database client in response to the user entering input search symbols or keywords and clicking a button to initiate the search processing. The type of search and various parameters relating to the selected search type are then transmitted to the database client process. The database client process and database server process then communicate as discussed herein to process the query and to return results thereof to the web browser in the form of an HTML page (or other format having hyperlinks). The present invention includes the following four query types.

File Contents

The file contents query is generated by the web browser to return the contents of one file from the collection of text documents in the database. The file contents are retrieved and display the by the web browser. The results retrieved and returned by the database client and server processing include hyperlinks for each symbol that is indexed in the database file for the returned text document. The hypertext links will invoke a query corresponding to the symbol for a "symbol in files" query as described herein below.

Substring in Paths

A substring in paths query is generated by the web browser to request a list of filenames for text documents in the collection of text documents which match a specified string. Each filename returned by the query results is displayed by the web browser as a hyperlink which specifies a file contents query for the corresponding file (as described above).

Substring in Symbols

A substring in symbols query command is generated by the web browser to request the list of symbol names that contain a specified substring. As returned from the database client process, each symbol named matching the substring is a hypertext links to a symbol in files query as described herein below.

Symbol in Files

A symbol in files query is generated by the web browser to request a list of lines that contain a specified symbol. Each line returned by the database client process includes the filename, line number, and line of text including the requested symbol. The filename as returned from the database client is a hyperlink specifying a file contents query for the corresponding file as described above.

Those skilled in the art will readily recognize that other query commands may be included within the scope of the present invention. Furthermore, those skilled in the art will recognize that subsets of the above described queries as well as other substituted queries relating to symbols within collections of text documents are within the scope of present invention. The above identified four query commands are intended as examples of a useful set of queries to permit rapid user searching for symbols or keywords in collections of text documents.

As noted above with respect to element 1008, certain search results are preferably returned from the server process in a tokenized format. In particular, in the preferred embodiment of the present invention, the results of a file contents query are returned in tokenized form such that all symbols in the database file are tokenized in the file contents returned from the database server to the database client. Other exemplary queries listed above generate search results from the server in a predefined format. Element 1008 above accepts all such formats for returned search results, tokenized and non-tokenized pre-defined formats), and converts them to pages having hyperlinks for items therein having likely interest for the user's next search request. The hyperlinks define a query for more information regarding the corresponding symbol or keyword.

As noted herein below, several of the above identified queries (in particular the Symbol in files query command) permit options to be specified to control the searching performed by the database server process to satisfy the query command. Certain such parameters are meaningful for particular types of text documents as processed by optimized parsers (as discussed above with respect to database build processing techniques). For example, in searching for symbols in C language source programs, it is often useful to search for symbol with or without case sensitive matching. Further it may be useful to search for a symbol outside of curly braces (i.e., to identify global symbol declarations as opposed to symbol references). Other such search parameters may include stripping leading underscore characters from symbols when matching for a requested substring. Another parameter may specify that the returned results should not be tokenized (as described herein below) and hence returned faster. For example, if the user requests the contents of a large text document or queries for a symbol likely to be found frequently in the collection of text documents, the user may realize in advance that the links are not required for subsequent searches. Specifying the "not tokenized" parameter allows the query results to be returned more quickly. The "not tokenized" parameter also permits the returned results to be usable for other than web browsing. For example, the returned information may be saved in a file.

Those skilled in the art will recognize a wide variety of such options that may be supported by the database server process and hence supported in the interface between the web browser and the database client process. The above list is intended merely as exemplary of the types of search parameters which may be specified in addition to the symbol or keyword search terms specified by the web browser user.

Present web browsers typically allow a displayed page (e.g., an HTML page) to specify that it is or is not cachable. The database client process of the present invention therefore sets appropriate attributes on records returned to the web browser to ensure that the records are cached locally by the web browser. Subsequent requests for other lines in a file may be satisfied locally by the web browser recognizing the information as resident in its local cache. In particular, for example, if the user issues a query identical to an earlier query, the web browser can recognize the earlier search results in its cache and speed the presentation of the results to the user. Or for example, if a user issues a query to display an entire text file, the file is presented to the user at a starting line number indicated by the user. If a subsequent query requests the same file, but perhaps a different starting line number, the web browser will recognize that the entire file is already cached and speed the display of the requested portion of the file to the user.

Database Client/Database Server Protocol

As noted herein above, the database client process re-formats the search command and parameters supplied to it by the web browser into an internal request and response format defined and supported by the database server process. The database server process defines a stateless version of the commands supported as well as a state based version of the supported search commands. In the state based version, the server process retains some state information regarding the processing requested by the database client process. For example, a first command describes the database file path name to be used for processing of queries. A second command specifies, for example, a particular query to be performed. When processing the second command, the database server process uses saved state information from prior commands to identify, for example, the path name of the database file to be used in satisfying the query. In a state based model such as this, a connection with a particular client process requires saved state information regarding that connection. In other words, the server process must maintain state information for each presently active client connection. Further, an active client connection must be "closed" to recover the resources in the server dedicated to that open connection.

In a stateless model, the best presently known mode for practicing the present invention, the database server process retains no such state information. Rather, each command (query request) received provides all information necessary to process the command (e.g., the database path name plus all values and parameters needed to process the query request). The connection with a client process exists only for the duration of processing that request. No state information is retained between such requests. The state based mode of practicing the present invention is however useful, as noted above, for development, testing, and debug of the database server process independent of the database client process (i.e., using a simple ASCII text command interface wherein saved state information need not be re-entered for testing of each command).

An exemplary preferred embodiment of the protocol used in communicating between a database client process and a database server process is described below. First, commands designed around a state based model of the interface are presented followed by the equivalent commands for the stateless model. In all cases below, a request format is shown with the label "REQ" and the associated response is labeled as "REPLY."

Responses generated by many of the commands listed below are "tokenized" in that the all symbols or keywords in the search results are returned as tokens (delimited by TOKEN_START and TOKEN_END delimiter bytes). Specifically, a file contents query issued by the user generates a QFILE server query command (as described below). The server process returns the entire file contents as an ASCII text stream wherein each symbol in the ASCII text stream is delimited as a token. The database client process, in turn, translates each token so delimited in the search results into a hyperlink for performing a further query on that symbol. Sill more specifically, the tokens in the search results are preferably transformed by the database client process into hyperlinks for locating associated information rapidly.

```
EOF_MARKER = 0
TOKEN_START = 1
TOKEN_END = 1
< >     ==   replaced by described information/parameters
[ ]     ==   optional information in protocol
{ }     ==   annotation, not part of client/server protocol
|       ==   alternate selections
REQ:        DBPATH <database path>
RESP:       1 | 0[: <error message>]
            This command and reply essentially establishes a connection between a client
            process and a server process and specifies the path name for the database file
            to be used for queries processed in this open connection. The reply simply
            indicates success of failure. In the case of failure an error message may be
            appended.
REQ:        QFILES <keyword>
RESP:F File1
     :      F File2
     :      F File3
     :      <repeat F . . . >
     :      -
REQ:        QPATHS <keyword>     {same as QFILES}
RESP:F File1
     :      F File2
     :      F File3
     :      <repeat F . . . >
     :      -
            These commands (essentially synonyms) return a list of file names in the
            presently open database file whose path names include the specified keyword
            substring.
REQ:        QLINES <keyword > <case_sensitive: 0 or 1> <outside_of_{ }: 0 or 1>
RESP:C <common_path>
     :      R <relative_path> {may be null}
     :      L <line #> <line_contents>
            {repeat R and L records for all lines in all files}
     :      -
            This command returns a list of files and lines in each file where the specified
            keyword is located in the collection of text documents associated with the
            presently open database file. The case_sensitive parameter specifies whether
            the case of the keyword is to be considered in performing the search. The
            outside_of_{ } parameter specifies that the search is to locate only matching
            keywords that are outside the scope of all C programming language blocks
            (delimited by pairs of curly braces).
REQ:        QSYMS <keyword> <case_sensitive: 0 or 1>
RESP:S <symname>
            {repeat S records for all matching symbols}
     :      -
            This command returns a list of all symbols found in the database which include
            (as a substring) the supplied keyword. As above, the case_sensitive parameter
            may be specified to indicate the relevance of the case of the keyword parameter
            in the search.
REQ:        QFILE <full_pathname: common_path + relative_path>
RESP:       1 | 0[: <error message>]
```

-continued

```
        :       B <number of bytes>
        :       <bytes of data>
                This command returns the entire contents of a file specified by its full file name
                as a parameter. First the number of bytes to be returned is returned (i.e., the
                length of the tokenized byte stream to follow) followed by the tokenized byte
                stream as described below.
<bytes of data> ==
        <data><TOKEN_START><token_data><TOKEN_END><data> { repeat }
        The tokenized byte stream format described above is the entire content of a
        requested file where each symbol in the text stream which was parsed by the
        database builder process and hence entered into the database file is identified
        as a token. As noted elsewhere, the database client process transforms this
        tokenized system into a corresponding page with hyperlinks for display. Each
        token is transformed into parameters appropriate for a QLINES command.
REQ:    Q VERSION
RESP:V <version string>
        This command merely returns a version number for the database server
        process. This allows the database client to adapt to upgrades in the features of
        the server process.
REQ:    QUIT
RESP:{none - socket disconnected}
        This command terminates an open connection to a client (in the state model).
The following commands represent extensions to the client/server protocol of the
present invention which provide for stateless operation as is preferred.
REQ:    Q PATHS <database path length> <database path> <keyword length>
        <keyword>
RESP:1 | 0[: <error message>]
        :       {see QPATHS for remainder}
        This command is identical in operation to the combination of a DBPATH
        command and a QPATHS command as described above. This command
        combines the parameters and return information to provide a stateless version
        of the command. The connection with the client is closed following completion
        of the command. The return data is as described above.
REQ:    Q LINES <database path length> <database path> <keyword length>
        <keyword>
        <case_sensitive: 0 or 1>
        <outside_of_{ }: 0 or 1>
        <match_leading_underscore: 0 or 1>
RESP:1 | 0[: <error message>]
        :       B <max line number> <number of lines to follow>
        :       {see QLINES for remainder}
        This command is essentially identical in operation to the combination of a
        DBPATH command and a QLINES command as described above. This
        command combines the parameters and return information to provide a stateless
        version of the command. The connection with the client is closed following
        completion of the command. The "B" return value include the number of lines
        to be returned so that the user may as early as possible determine whether the
        results are worth viewing. The return data is as described above.
REQ:    Q SYMS <database path length> <database path> <keyword length>
        <keyword>
        <case_sensitive: 0 or 1>
RESP:1 | 0[: <error message>]
        :       {see QSYMS for remainder}
        This command is essentially identical in operation to the combination of a
        DBPATH command and a QSYMS command as described above. This
        command combines the parameters and return information to provide a stateless
        version of the command. The connection with the client is closed following
        completion of the command. The return data is as described above.
REQ:    Q FILE <database path length> <database path> <size of full path>
        <full_path: common_path + relative_path> <tokenized: 0 or 1>
RESP:1 | 0[: <error message>
        :       {see QFILE for remainder}
        This command is essentially identical in operation to the combination of a
        DBPATH command and a QLINES command as described above. This
        command combines the parameters and return information to provide a stateless
        version of the command. The connection with the client is closed following
        completion of the command. The return data is as described above.
```

Exemplary Screen Displays

Figure 4:
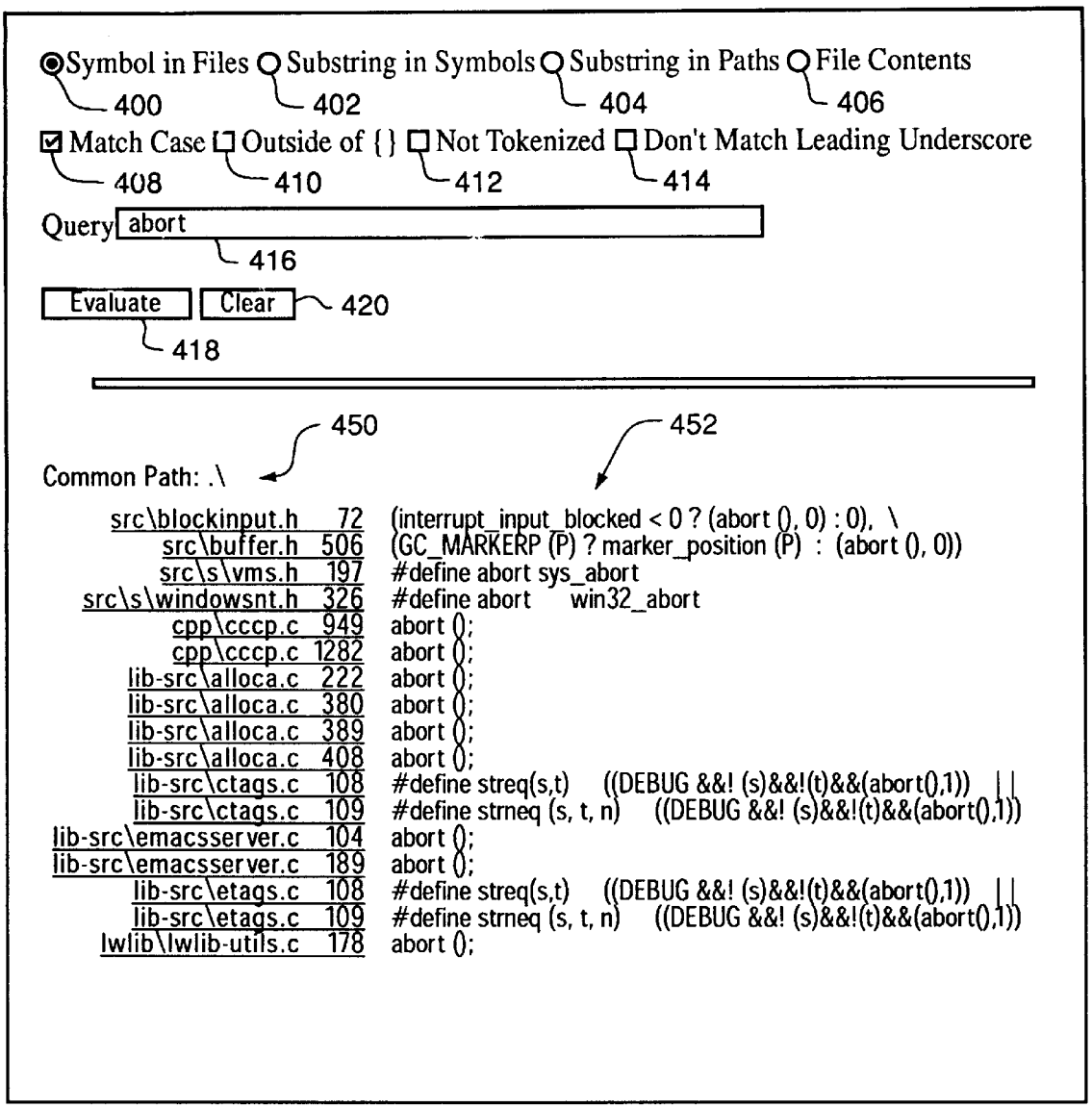
FIG. 4 is an exemplary computer display screen showing the results of a symbol in files query operation by the present invention of FIG. 1.

FIGS. 4 through 7 are exemplary screen displays on a web browser which typify the operation of the present invention. In particular, FIG. 4 is a screen display exemplifying the query and response for a Q LINES query (as described above). Checkboxes 400–406 select the type of query operation desired as marked on the textual label associated with each checkbox. These operations correspond to the four operations supported in the web browser to database client process interface. As shown in FIG. 4, a symbol in files query is requested by virtue of checkbox 400 being marked. This query request is transformed by the database client process into a Q LINES server request.

Checkboxes 408–414 are used to select search options appropriate for the type of search requested. The parameters correspond to the textual label associated with each checkbox on FIG. 4 and as described herein above. As shown in FIG. 4, the user has requested that the Symbol in files query request match the case of the supplied keyword with the tokens in the database file search.

Query box 416 permits the user to enter a keyword which is to be searched by the query request. In particular, the query specified by the user as exemplified in FIG. 4 is to search for the symbol "abort" in all files and to match the lower case specified by the user.

Buttons 418 and 420 are used to control operation of the browser. In particular, the user clicks button 418 to evaluate (perform) the search specified in the query and checkboxes. The user clicks button 420 to clear the search parameters and query keywords.

Any common portion of the path names of all files in the collection of text documents is shown at label 450. List 452 displays the results of the Symbol in files query request. All lines in the collection of text documents which contain the keyword "abort" (in lower case) are displayed including the file name (the relative portion of the path name devoid of the common portion of the path name shown at 450), the line number and the line of text from the corresponding file.

Each file path name in the result list 452 is a hypertext link to generate a File Contents query for the corresponding query. By clicking on the link, the user navigates to a listing of the file contents of the corresponding file.

Figure 5:
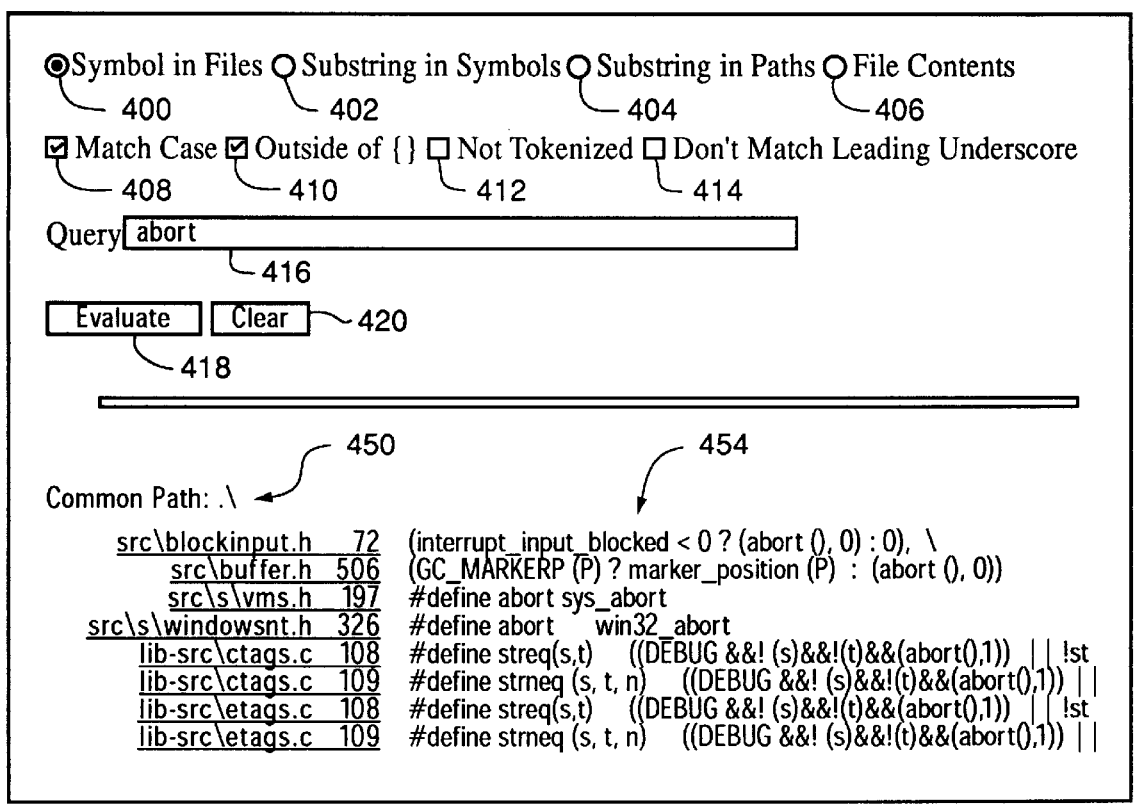
FIG. 5 is an exemplary computer display screen showing the results of another symbol in files query operation by the present invention of FIG. 1.

FIG. 5 shows a similar query to that shown in FIG. 4 but with the Outside of { } checkbox 410 marked. As can be seen in FIG. 5, the results list 454 shows only the subset of lines listed in FIG. 4 at 452 in which "abort" appears outside curly braces (i.e., in global declaration contexts).

Figure 6:
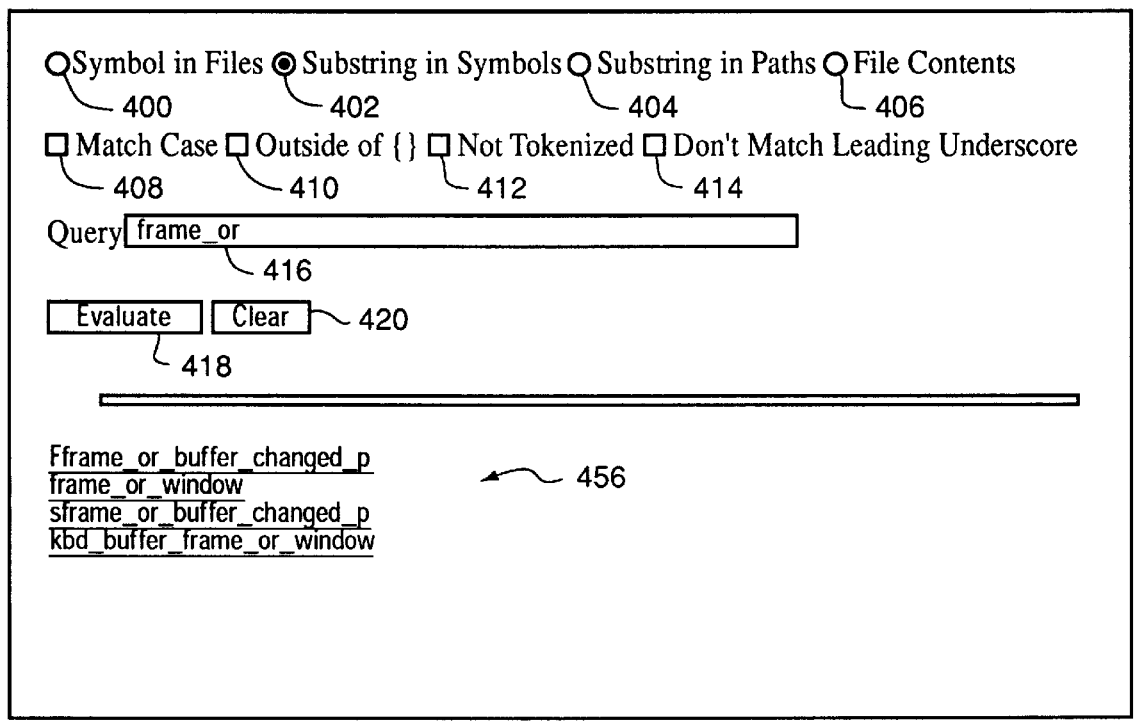
FIG. 6 is an exemplary computer display screen showing the results of a substring in symbols query operation by the present invention of FIG. 1.

FIG. 6 is an exemplary screen display showing a Substring in Symbols query (as indicated by the mark in checkbox 402). The query in box 416 requests that the server locate all symbols having "frame_of" as a substring be displayed. The result list 456 shows all such symbols which contain the substring "frame_of." Each symbol in the results list is a hypertext link to generate a Symbol in Files query request for the corresponding file.

Figure 7:
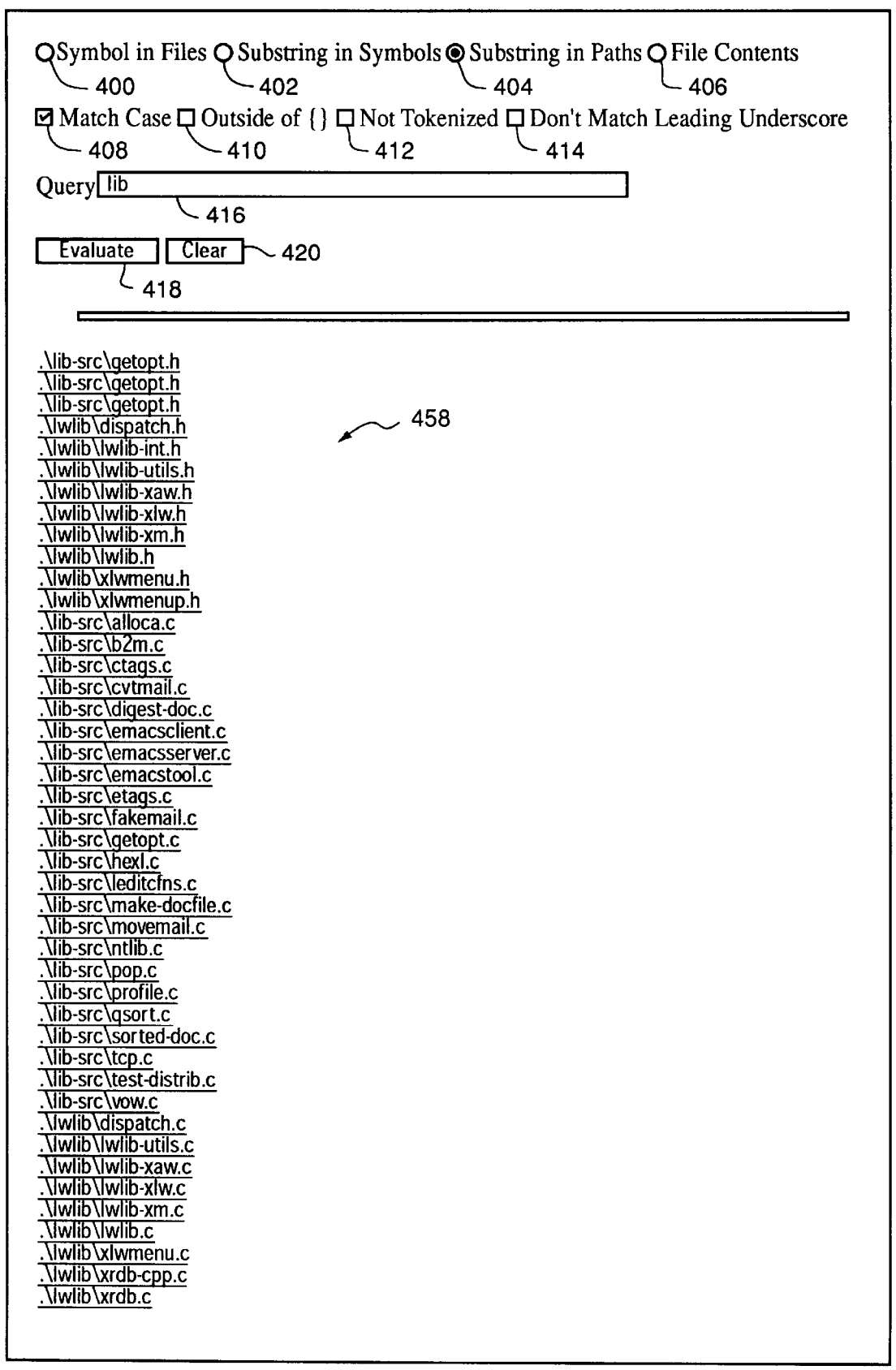
FIG. 7 is an exemplary computer display screen showing the results of a substring in paths query operation by the present invention of FIG. 1.

FIG. 7 is another exemplary screen display typifying a Substring in Paths query request and results (as indicated by the marked checkbox 404). The query specifically requests a list of all file names (paths) which contain the substring "lib" as entered in box 416. Results list 458 shows the relative portion of all paths known in the database which contain the specified string as a substring. Each listing in the results list is a hypertext link to generate a file contents query request for the corresponding file.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A database file structure for locating symbols within a text document comprising:

a hash table comprising a plurality of buckets wherein each of said plurality of buckets points to a variable length list of symbol entries for which the associated symbol hashes to a hash value corresponding to the bucket;

a variable length list of at least one symbol entry, distinct from said plurality of buckets, pointed to by at least one of said plurality of buckets wherein each of said at least one symbol entry points to a variable length list of file index entries each corresponding to a text document in which a corresponding symbol is found;

a variable length list of at least one file index entry, distinct from said plurality of buckets and distinct from said variable length list of at least one symbol entry, pointed to by one of said at least one symbol entry wherein each of said at least one file index entry points to a variable length list of line number entries each corresponding to a line number at which said corresponding symbol is located in the corresponding text document; and a variable length list of at least one line number entry, distinct from said plurality of buckets and distinct from said variable length list of at least one symbol entry and distinct from said variable length list of at least one file index entry, pointed to by one of said at least one file index entries wherein each of said at least one line number entry provides a location in a text document at which the corresponding symbol is found in the corresponding text document.

2. The database file structure of claim 1 wherein all integer values used as pointers and locations are compressed such that:

values in the range 0 through 127 use a single byte of storage;

values in the range 128 through 16,383 use two bytes of storage;

values in the range 16,384 through 2,097,151 use three bytes of storage; and values higher than 2,097,152 use at least four bytes of storage.

\* \* \* \* \*